(12) United States Patent
Kornev et al.

(10) Patent No.: US 11,415,430 B2
(45) Date of Patent: Aug. 16, 2022

(54) METHOD OF AND SERVER FOR PRESENTING POINTS OF INTEREST TO USER ON MAP

(71) Applicant: YANDEX EUROPE AG, Lucerne (CH)

(72) Inventors: Dmitry Vasilievich Kornev, Ekaterinburg (RU); Yury Pavlovich Gorishny, Nizhny Novgorod (RU); Filipp Gennadievich Sinitsin, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 410 days.

(21) Appl. No.: 16/565,858

(22) Filed: Sep. 10, 2019

(65) Prior Publication Data

US 2020/0209013 A1   Jul. 2, 2020

(30) Foreign Application Priority Data

Dec. 29, 2018  (RU) .......................... RU2018147499

(51) Int. Cl.
*G01C 21/36* (2006.01)
*G01C 21/34* (2006.01)
(Continued)

(52) U.S. Cl.
CPC ..... *G01C 21/3682* (2013.01); *G01C 21/3476* (2013.01); *G01C 21/367* (2013.01); *G06N 3/08* (2013.01); *G06N 20/00* (2019.01)

(58) Field of Classification Search
CPC ............ G01C 21/3682; G01C 21/3476; G01C 21/367; G06N 20/00; G06N 3/08
See application file for complete search history.

(56) References Cited

U.S. PATENT DOCUMENTS 9,080,885 B2 *  7/2015  Kocienda .............. G01C 21/367
9,146,129 B1 *  9/2015  Furio .................. G01C 21/3679
(Continued)

FOREIGN PATENT DOCUMENTS

CN    107798412 A    3/2018
GB    2473879 A      3/2011
(Continued)

OTHER PUBLICATIONS

Waga, Karol et al. "Recommendation of points of interest from user generated data collection", IEEE Oct. 14-17, 2012, Print ISBN: 978-1-4673-2740-4, 10.4108/icst.collaboratecom.2012.250451, retrieved from https://ieeexplore.ieee.org/document/6450950/on Mar. 1, 2019.
(Continued)

*Primary Examiner* — Ramsey Refai
(74) *Attorney, Agent, or Firm* — BCF LLP

(57) ABSTRACT

A method and server for presenting points of interest (POIs) to a given user in a map application on a client device comprising: receiving a request for displaying a given location on a map view of the map application and retrieving, based on the map view and the given location, a set of POIs. A set of web services associated with the given user is determined, and past user interaction data with the set of web services partially indicative of user preferences of the given user with regard to the set of POIs is retrieved. The set of POIs is ranked based on the respective past user interaction data to obtain a ranked set of POIs. The map view including at least a subset of the ranked set of POIs is transmitted for presentation to the given user on a display interface of the client device.

17 Claims, 7 Drawing Sheets

(51) Int. Cl.
*G06N 3/08* (2006.01)
*G06N 20/00* (2019.01)

(56) References Cited

U.S. PATENT DOCUMENTS

| | | | |
|---|---|---|---|
| 9,443,494 B1 | 9/2016 | Parish et al. | |
| 9,779,545 B1 | 10/2017 | Impas et al. | |
| 2004/0260465 A1* | 12/2004 | Tu | G01C 21/34 |
| | | | 701/426 |
| 2009/0322753 A1* | 12/2009 | De Mers | G01C 23/00 |
| | | | 345/428 |
| 2011/0270517 A1* | 11/2011 | Benedetti | G01C 21/3697 |
| | | | 715/730 |
| 2012/0173370 A1 | 7/2012 | Soroca et al. | |
| 2012/0197524 A1* | 8/2012 | Beyeler | G01C 21/3476 |
| | | | 701/426 |
| 2013/0321466 A1* | 12/2013 | Kocienda | G01C 21/367 |
| | | | 345/635 |
| 2015/0160028 A1* | 6/2015 | Burrows | G01C 21/3679 |
| | | | 701/527 |
| 2015/0253144 A1 | 9/2015 | Rau et al. | |
| 2017/0357381 A1 | 12/2017 | Dal Santo et al. | |
| 2018/0080776 A1 | 3/2018 | Nimchuk et al. | |

FOREIGN PATENT DOCUMENTS

| | | |
|---|---|---|
| WO | 2016191737 A2 | 12/2016 |
| WO | 2018175750 A1 | 9/2018 |

OTHER PUBLICATIONS

Russian Search Report dated Apr. 6, 2022 issued in respect of the counterpart Russian Patent Application No. RU 2020113274.

* cited by examiner

METHOD OF AND SERVER FOR PRESENTING POINTS OF INTEREST TO USER ON MAP

CROSS-REFERENCE

The present application claims priority from Russian Patent Application No. 2018147499, entitled "Method of and Server for Presenting Points of Interest to User on Map", filed Dec. 29, 2018, the entirety of which is incorporated herein by reference.

FIELD

The present method and server described herein are directed towards map rendering, more specifically, to a method of and a server for presenting points of interest (POIs) to a given user in a map application.

BACKGROUND

As the use of maps for displaying information has increased in popularity, so has the volume and complexity of information to be displayed. Thus, it is now more difficult to take in the wide range of data that should be implemented or embedded on the electronic map without the user desirous to view the map becoming confused or overwhelmed by the display of the rendered map having too much of information displayed thereupon.

This problem is particularly acute in the field of map-based or location-based services, where the ever increasingly detailed nature of the information to be displayed, together with the potentially limitless number of resources from which data is gathered, combine to make it extremely challenging to display such information on the map in a logical manner that is accessible and, more particularly, useful to users.

Furthermore, some users may not even require all of the information that is being displayed to them on the map for their specific needs. This may be problematic since transmitting all the information to be displayed may require a considerable amount of time, especially if some information to be displayed ought to be interactive or dynamic. For example, a user scrutinizing a city centre of a given city on a map may not be presented with information about all points of interests (POIs) in the city center due to the sheer amount of businesses, museums and other locations of interests being present and may thus overlook locations of interest to him or her (especially if he or she does not know what she is looking for).

For example, map applications or web browsers typically download map data to a client device through a network in response to an indication that a user being desirous of viewing the map. A conventional method for downloading map data is to have the client device communicate the request for data to a remote server via the network, which, in response, transmits all map data at once to the client device.

Map data may generally be stored in blocks known as "map tiles", where the number of map tiles increases with zoom level. The remote server provides all map tiles for a particular location or region to the client device for storage and/or rendering of the map on the client device. Additional information for embedding interactive maps, such as additional resources and additional application programming interfaces (APIs), may also be requested by the client device. However, the larger the number of map tiles and additional data necessary to display an interactive map, the longer the retrieving and the rendering time, especially if the network is slow or not stable.

In some instances, the sheer amount of information presented on the map tiles for a given zoom level, which may be presented in the form of POIs, may be encumbering for the user.

U.S. Pat. No. 9,443,494 B1 granted on Sep. 13, 2016 to Amazon Technologies Inc and entitled "Generating bounding boxes for labels placement" teaches that a computing device can receive, from a map search system and in response to a map search query, map data that describes a geographic region. Each map label includes one or more text characters. A respective bounding box for each map label that is defined by an aspect ratio having a width and a height can be generated. The width of the bounding box is twice that of the height of the bounding box and an area for the bounding box is the same as an area for the map label. Map labels can be selected for display in an interactive geographic map. The interactive geographic map that displays the selected map labels that each describes a feature that is located in the geographic region can be generated. Each selected map label is enclosed by a respective bounding box for the map label.

U.S. Pat. No. 9,779,545 B1 granted on Oct. 3, 2017 to Microsoft Technology Licensing LLC and entitled "Footprint based business label placement" teaches to locate business labels within the footprint of a building shown on a digital map. An optimal arrangement comprises business labels displayed entirely within the building footprint without the business labels overlapping each other. The technology initially generates label arrangements and calculates a cost for the arrangements. A cost of zero means the arrangement is optimal. For non-zero costs, a lower cost means the arrangement is close to an optimal arrangement. The technology can continue to generate arrangements for analysis until an acceptable arrangement is found.

United States Patent Application Publication No. 2017/0357381 A1 published on Dec. 14, 2017 to Apple Inc and entitled "Labeling a significant location based on contextual data" teaches computer-implemented methods, computer-readable storage media storing instructions and computer systems for labeling significant locations based on contextual data can be implemented to perform operations that include determining a location of a computing device, and determining a label for the determined location based on contextual data associated with the significant location. The location can be a significant location that has meaning to a user of the device.

SUMMARY

It is an object of the present technology to ameliorate at least some of the inconveniences present in the prior art.

Embodiments of the present technology have been developed based on developers' appreciation that in some instances, a user zooming on a map view of a map service, such as a map view representing a city center for example, may be overwhelmed by the sheer amount of points of interests (POIs) presented to him or her on the map view. Whether the user knows what he or she is looking for or not, the amount of presented information presented may prevent the user from navigating the map view efficiently, which may in turn make the user overlook a particular POI that would have been of high interest to him or her. Further, developer(s) have appreciated that in some situations, presenting all information for POIs in the map view may not only clutter the graphical interface, but also induce delays in presenting the information. Such factors may not only be frustrating to the user, but may also use computational resources on the client device inefficiently, as the user may have to go back and forth on the map service, make a new search on a search engine for example, to locate what the user is looking for.

Developer(s) of the present technology have also acknowledged that service providers, such as Google™, Yahoo™, and Yandex™ for example, typically provision users with a variety of services: cloud, advertising, mapping, calendars, translation, e-mail, social network, music, video, online shopping, and cloud storage space, among others. Generally, such service providers have access to user interaction logs, where interactions performed by users with one or more of the variety of services, such as submitted queries, viewed documents, clicks, and the like, as well as location data of the users, are stored.

Accordingly, developer(s) have made the assessment that such user interaction information may be leveraged to improve presentation of POIs to users of a map service, by presenting more personalized POI suggestions to users, while also presenting a subset of all available POIs for given zoom level on a map view.

In some non-limiting embodiments of the present technology, developer(s) have considered that preferences of a given user for an object on a map, such as a restaurant, museum, or store for example, may be reflected in past user interaction data of the given user with the one or more services, including the map service, and user features indicative of the preferences may be generated. A machine learning algorithm (MLA) may represent the user features in the form of a vector in a multi-dimensional space. In addition, POI features may be extracted from the POIs, such as category they pertain to, and may also be represented in the form of a POI vector in the same multi-dimensional space. Distances between the user vector and the POI vectors in the multi-dimensional space may subsequently be determined, and may indicate, at least partially, a relevance of a given POI to the user. Such information may be used to rank a set of POIS for the given user, which may then be presented at least partially for a given zoom level to the user of the map service.

Thus, the present technology is directed to a method of and server for presenting points of interest to a user on a map of a map service.

In accordance with a first broad aspect of the present technology, there is provided a computer-implemented method for presenting points of interest (POIs) to a given user in a map application executed by a client device associated with the given user, the client device being connected to the server, the server executing a map service, where the method is executable by the server. The method comprises receiving, by the server from the client device, a request for displaying a given location on a map view of the map application. The method comprises retrieving, by the server, based on the map view and the given location, a set of POIs. The method comprises determining, by the server, based on the request, a set of web services associated with the given user, the set of web services including at least the map service. The method comprises retrieving, by the server, for at least some of the set of web services, respective past user interaction data of the given user with the respective web service, the respective past user interaction data being at least partially indicative of user preferences of the given user with regard to the set of POIs. The method comprises ranking, by the server, based on the respective past user interaction data, the set of POIs to obtain a ranked set of POIs. The method then comprises transmitting, by the server to the client device, the map view, the map view including at least a subset of the ranked set of POIs for presentation to the given user on a display interface of the client device.

In some embodiments of the method, the method further comprises, prior to the transmitting: determining, by the server, for each zoom level of a plurality of zoom levels on the map application, a respective number of POIs in the subset of POIs to display on the map view.

In some embodiments of the method, the subset of the ranked set of POIs corresponds to the respective number for a current zoom level.

In some embodiments of the method, the subset of the ranked set of POIs corresponds to the respective number for a requested zoom level.

In some embodiments of the method, the determining the set of web services associated with the given user includes determining a user profile associated with the given user based on the request.

In some embodiments of the method, the method further comprises analyzing the user profile to determine at least one parameter used ranking POIs.

In some embodiments of the method, the set of web services includes at least one of: an email service, a taxi service, a ride sharing service, a navigation service, and a browser service.

In some embodiments of the method, each POI of the set of POIs has at least one feature, the at least one feature being at least one of: a name, a description, a category, and a location. The retrieving the respective past user interaction data is based at least in part on respective past user interactions of the given user with the at least one feature in the respective web service.

In some embodiments of the method, the method further comprises, prior to the retrieving the set of POIs: generating, by a machine learning algorithm (MLA) executed by the server, for each POI of the set of POIs, a respective vector representation of the POI in a multidimensional space, the respective vector representation being based on the at least one feature. The method further comprises, prior to the ranking the set of POIs: generating, by the MLA, based on the respective past user interaction data of the given user with the at least one feature in the set of web services, a given user vector in the multidimensional space. The ranking is based at least in part on respective distances between the given user vector and each respective vector representation of the POI in the set of POIs.

In some embodiments of the method, the method further comprises, prior to the ranking the set of POIs: retrieving, by the server, a set of user vectors having been previously generated by the MLA, each respective user vector being associated with a respective user of the set of web services, each respective user vector having been generated based on respective past user interactions of the respective user with the at least one feature. The method comprises determining, by the MLA, a respective distance between the given user vector and each respective user vector of the set of user vectors. The MLA selects at least one user vector having a minimal distance with the given user vector. The ranking is further based at least in part on respective distances between the at least one user vector and each respective vector representation of the POI in the set of POIs.

In some embodiments of the method, the subset of the ranked set of POIs includes at least one POI having no past user interaction data from the given user.

In some embodiments of the method, the MLA is a neural network (NN).

In some embodiments of the method, the MLA is a Deep Structured Semantic Model (DSSM).

In some embodiments of the method, the past user interaction data includes at least one of: past number of clicks on the POI of the set of POIs, and past number of visits at the POI of the set of POIs.

In some embodiments of the method, the retrieving, by the server, for at least some of the set of web services comprises retrieving for each web service of the set of web services.

In accordance with a second broad aspect of the present technology, there is provided a server for presenting points of interest (POIs) to a given user in a map application executed by a client device associated with the given user, the client device being connected to the server, the server executing a map service, the server comprising: a processor, a non-transitory computer-readable medium comprising instructions. The processor, upon executing the instructions, is configured to: receive from the client device, a request for displaying a given location on a map view of the map application and retrieve based on the map view and the given location, a set of POIs. The processor is configured to determine based on the request, a set of web services associated with the given user, the set of web services including at least the map service. The processor is configured to retrieve for at least some of the set of web services, respective past user interaction data of the given user with the respective web service, the respective past user interaction data being at least partially indicative of user preferences of the given user with regard to the set of POIs. The processor is configured to rank based on the respective past user interaction data, the set of POIs to obtain a ranked set of POIs. The processor is then configured to transmit to the client device, the map view, the map view including at least a subset of the ranked set of POIs for presentation to the given user on a display interface of the client device.

In some embodiments of the server, the processor is further configured to, prior to the transmitting, to determine for each zoom level of a plurality of zoom levels on the map application, a respective number of POIs in the subset of POIs to display on the map view.

In some embodiments of the server, the subset of the ranked set of POIs corresponds to the respective number for a current zoom level.

In some embodiments of the server, the subset of the ranked set of POIs corresponds to the respective number for a requested zoom level.

In some embodiments of the server, the determining the set of web services associated with the given user includes determining a user profile associated with the given user based on the request.

In some embodiments of the server, the processor is further configured to analyze the user profile to determine at least one parameter used ranking POIs.

In some embodiments of the server, the set of web services includes at least one of: an email service, a taxi service, a ride sharing service, a navigation service, and a browser service.

In some embodiments of the server, each POI of the set of POIs has at least one feature, the at least one feature being at least one of: a name, a description, a category, and a location. The retrieving the respective past user interaction data is based at least in part on respective past user interactions of the given user with the at least one feature in the respective web service.

In some embodiments of the server, the processor is further configured to, prior to the retrieving the set of POIs: generate, via a machine learning algorithm (MLA) executed by the server, for each POI of the set of POIs, a respective vector representation of the POI in a multidimensional space, the respective vector representation being based on the at least one feature. The processor is further configured to, prior to the ranking the set of POIs, generate, via the MLA, based on the respective past user interaction data of the given user with the at least one feature in the set of web services, a given user vector in the multidimensional space. The ranking is based at least in part on respective distances between the given user vector and each respective vector representation of the POI in the set of POIs.

In some embodiments of the server, the processor is further configured to, prior to the ranking the set of POIs: retrieve a set of user vectors having been previously generated by the MLA, each respective user vector being associated with a respective user of the set of web services, each respective user vector having been generated based on respective past user interactions of the respective user with the at least one feature. The processor is further configured to determine, via the MLA, a respective distance between the given user vector and each respective user vector of the set of user vectors, and select, via the MLA, at least one user vector having a minimal distance with the given user vector. The ranking is further based at least in part on respective distances between the at least one user vector and each respective vector representation of the POI in the set of POIs.

In some embodiments of the server, the subset of the ranked set of POIs includes at least one POI having no past user interaction data from the given user.

In some embodiments of the server, the MLA is a neural network (NN).

In some embodiments of the server, the MLA is a Deep Structured Semantic Model (DSSM).

In some embodiments of the server, the past user interaction data includes at least one of: past number of clicks on the POI of the set of POIs, and past number of visits at the POI of the set of POIs.

In some embodiments of the server, the retrieving for at least some of the set of web services comprises retrieving for each web service of the set of web services.

The present technology, in at least some embodiments thereof, may allow generating and transmitting commands for partially and immediately displaying the map with information immediately useful to the user and/or immediately needed to the user and/or immediately required for rendering of the map or interactive elements, while the rest of the map and the rest of are retrieved and/or rendered by the client device at a later time. Such an approach may allow reducing computational resources required to display map elements on the client device.

In the context of the present specification, the expression "point of interest" (POI) means an object or a group of objects which can be of interest to a user. For example, health care facilities, culture and leisure centers, sightseeing attractions, foodservice facilities, transportation infrastructure objects (for example, gas-filling stations) and the like can be points of interest.

A point of interest can be an individual object (for example, the Cathedral of the Archangel of the Kremlin, the Cathedral of the Annunciation of the Kremlin, the Tsar Cannon and the like), as well as a group of objects, which together constitute one point of interest (for example, the Moscow Kremlin).

In the context of the present specification, the expression "marker" means a point on a map which refers to an object or a group of objects (a marker of a point of interest), or which refers to a center of mass of points of interest aggregated into one cluster.

In the context of the present specification, the expression "marker of a point of interest" means a point on a map which refers to an object or a group of objects. The marker of the point of interest can include information about the object(s), such as a name, type, address, contact information. The marker of the point of interest can be a point-like object and have a position on a map and be invisible to a user. The marker of the point of interest can have a graphical character, which refers to the given marker of the point of interest and which is visible to the user.

In the context of the present specification, the expression "graphical character" means a graphical image representing a point of interest (a marker of a point of interest) on a map or a cluster which includes more than one point of interest. The graphical character can be a spatial object, which is mapped and is visible to the user. Graphical characters can have various geometric shapes and sizes. The graphical character can also include alphabetic, numerical and alphanumeric information. Graphical characters can be implemented in various colors.

In the context of the present specification, unless expressly provided otherwise, a "server" is a computer program that is running on appropriate hardware and is capable of receiving requests (e.g. from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, unless expressly provided otherwise, "client device" is any computer hardware that is capable of running software appropriate to the relevant task at hand. Thus, some (non-limiting) examples of client devices include personal computers (desktops, laptops, netbooks, etc.), smartphones, and tablets. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, unless expressly provided otherwise, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the expression "component" is meant to include software (appropriate to a particular hardware context) that is both necessary and sufficient to achieve the specific function(s) being referenced.

In the context of the present specification, unless expressly provided otherwise, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a file could include the file itself (i.e. its contents), or it could be a unique file descriptor identifying the file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication. Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DESCRIPTION

Figure 1:
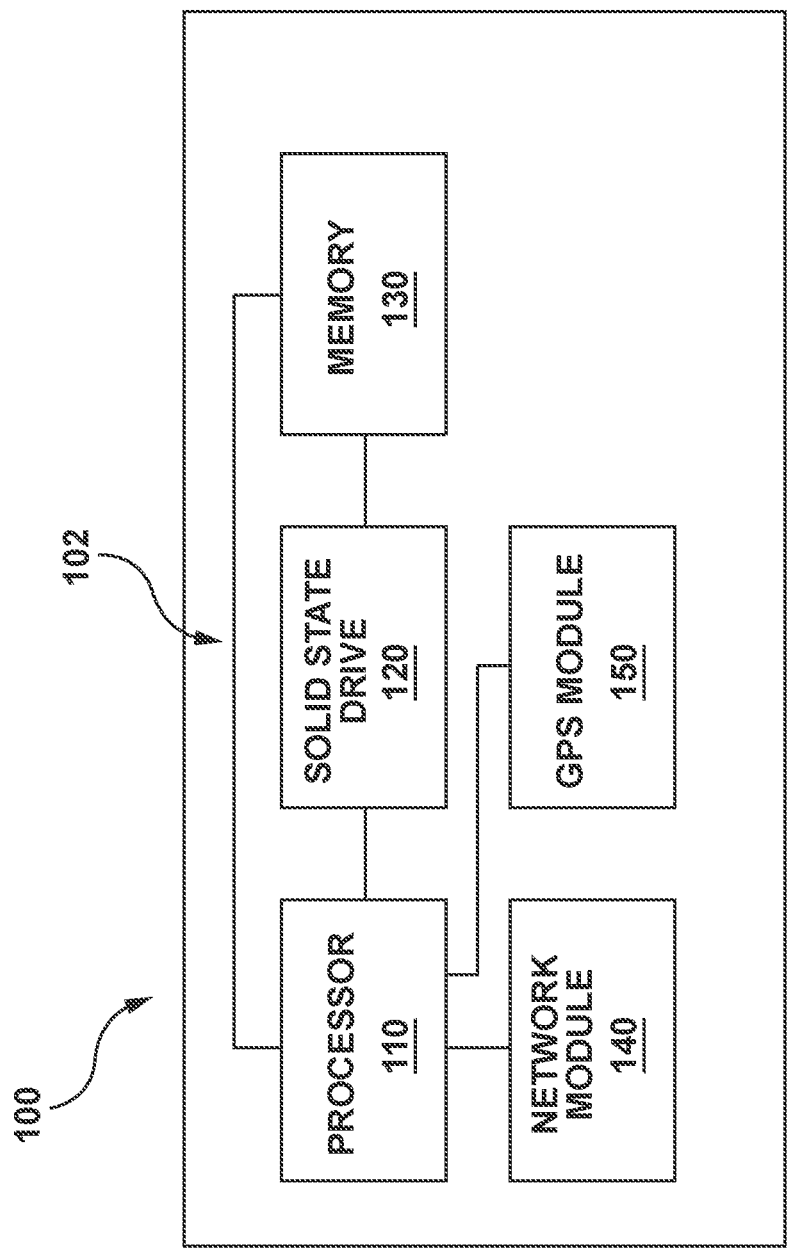
FIG. 1 depicts a schematic diagram of a computer system implemented in accordance with non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labelled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application-specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

System Description

Computer System

With reference to FIG. 1, there is shown a computer system 100 suitable for use with some implementations of the present technology, the computer system 100 comprising various hardware components including one or more single or multi-core processors collectively represented by a processor 110, a solid-state drive 120, a memory 130, which may be a random-access memory, a network module 140, and a GPS module 150. Communication between the various components of the computer system 100 may be enabled by one or more internal and/or external buses (generally depicted at 102), e.g. a PCI bus, universal serial bus, IEEE 1394 "Firewire" bus, SCSI bus, Serial-ATA bus, etc., to which the various hardware components are electronically coupled. In the non-limiting embodiment depicted in FIG. 1, the communication within the computer system 100 is implemented in a "hub and spoke" manner via the processor 110; however, in alternative implementations of the present technology, the communication can be implemented differently.

According to embodiments of the present technology, the solid-state drive 120 stores program instructions suitable for being loaded into the memory 130 and executed by the processor 110 for displaying information to a user of the computer system 100 as will be described in further detail below. For example, the program instructions may be part of a map or navigational application executable by the processor 110. The network module 140 and the GPS module 150 allow communication between different computer systems, servers and/or other devices.

Networked Computing Environment

Figure 2:
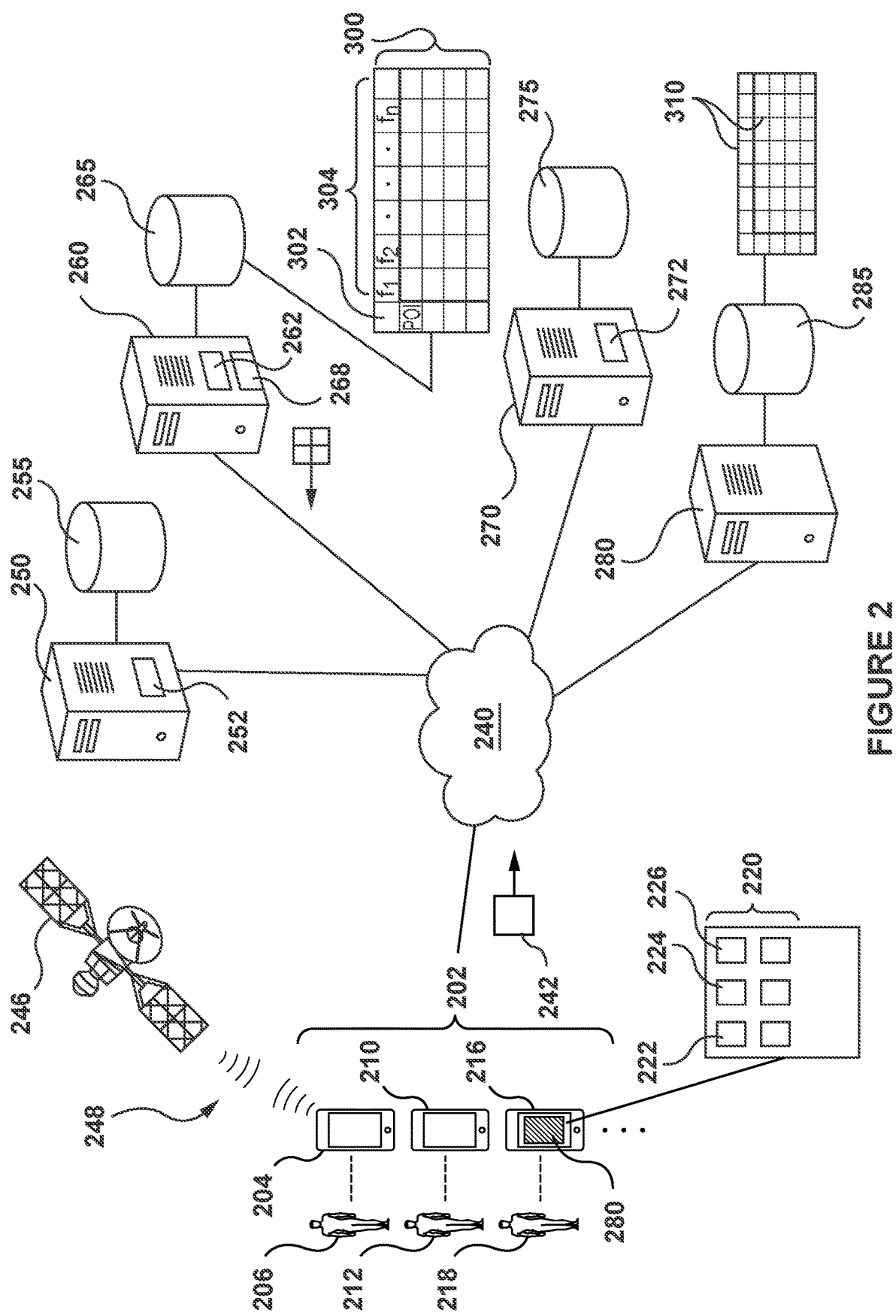
FIG. 2 depicts a schematic diagram of a networked computing environment implemented in accordance with non-limiting embodiments of the present technology.

FIG. 2 illustrates a networked computing environment 200 suitable for use with some embodiments of the systems and/or methods of the present technology. The networked computing environment 200 comprises a plurality of electronic devices 202, a search engine server 250, a map server 260, one or more other servers 270, and a tracking server 280 coupled to a communication network 240 via respective communication links (not numbered).

Plurality of Electronic Devices

The plurality of electronic devices 202 comprises a first electronic device 204, a second electronic device 210, and a third electronic device 216 respectively associated with a first user 206, a second user 212, and a third user 218. While only the first electronic device 204, the second electronic device 210, and the third electronic device 216 are illustrated (all are shown in FIG. 2), it is contemplated that any number of electronic devices associated with respective users could be connected to the networked computing environment 200. It is further contemplated that in some implementations, the number of electronic devices included in the networked computing environment 200 could number in the tens or hundreds of thousands.

It should be noted that although the plurality of electronic devices 202 is depicted as comprising three distinct electronic devices, this may not and does not need to be the case in each and every implementation of the present technology. In fact, the plurality of electronic devices 202 could number in the tens or hundreds of thousands.

The implementation of a given electronic device from the plurality of electronic devices 202 is not particularly limited, but as an example, the given electronic device may be implemented as a wireless communication device such as a mobile telephone (e.g. a smart phone or a radio-phone), a vehicle navigation device (e.g. TomTom™, Garmin™), a tablet, a personal computer and the like. However in FIG. 2, each given electronic device is depicted as a smart phone (although, they do not need to be implemented the same and a given one of the electronic devices may be implemented from another one of the electronic devices).

The given electronic device may comprise some or all of the components of the computer system 100 depicted in FIG. 1. In some embodiments, the given electronic device comprises the network module 140 for communication via the communication network 240, the GPS module 150 for receiving and transmitting a GPS signal 248 to a GPS satellite 246 (i.e., for enabling GPS capabilities of the given electronic device), the processor 110, the memory 130, and a display interface such as a touch-screen for example.

One or More Service Applications

The given electronic device comprises hardware and/or software and/or firmware, or a combination thereof, for executing one or more service applications 220, depicted in FIG. 2 in association with the third electronic device 216.

Generally speaking, the one or more service applications 220 include at least a map application 222. In some embodiments of the present technology, the one or more service applications 220 include the map application 222, and a browser application 224. In other embodiments of the present technology, the one or more service applications 220 include the map application 222, the browser application 224, a news application (not numbered), a taxi application (not numbered), a food delivery application (not numbered), a market application (not numbered), a social media application (not numbered), a music streaming application (not numbered), etc.

In a specific non-limiting embodiment of the present technology, the map application 222 may be implemented as Yandex.Maps™ or Yandex.Navigator™ applications made available by Yandex LLC of Lev Tolstoy Street, No. 16, Moscow, 119021. In other embodiments of the present technology, the functionality of the map application 222 may be accessed via the browser application 224, as an example by entering a uniform resource locator (URL) associated with the map service provided by the map application 222. In some embodiments of the technology, the one or more service applications 220 are configured to share a current location of the given electronic device, as an example via the network module 140 and/or GPS module 150. Additionally, the given electronic device may be configured to augment the GPS information using wireless-network mapping techniques that determine a geographic location based on the presence of certain wireless networks proximate to the user device (e.g., Wi-Fi mapping).

In the specific non-limiting embodiment where the map application 222 is Yandex.Maps™ or Yandex.Navigator™, the one or more service applications 220 may include one or more of: the browser application 224 as Yandex.Browser™, a news application as Yandex.News™, a market application as Yandex.Market™, a taxi application as Yandex.Taxi™, an email application as Yandex.Mail™, a music streaming application as Yandex.Music™, a food delivery application as Yandex.Eda™, and the like. In some embodiments of the present technology, where the one or more service applications 220 are operated by a single entity, a given user (such as the third user 218) may log on the one or more service applications 220 by using a single login and password. In other embodiments of the present technology, the given user may not need to log on the one or more service applications 220, or may have different logins and passwords for each of the one or more service applications 220.

Needless to say, the one or more service applications 220 may also include service applications that are not operated by the same entity that has provided the afore-mentioned map application 222, and may comprise for example, social media applications such as Vkontakte™ and Facebook™, video streaming applications such as YouTube™ and music streaming applications such as Spotify™ for example.

In some embodiments of the present technology, each of the one or more service applications 220 may be configured to track user activities of users, which may be stored locally on the electronic device associated with the given user (e.g. in the memory 130 of the third electronic device 216 of the third user 218), or a transmitted to the tracking server 280.

Communication Network

Each of the plurality of electronic devices 202 is coupled to a communication network 240 via a communication link (not numbered). In some non-limiting embodiments of the present technology, the communication network 240 can be implemented as the Internet. In other embodiments of the present technology, the communication network 240 can be implemented differently, such as any wide-area communication network, local-area communication network, a private communication network and the like.

How the communication link (not numbered) is implemented is not particularly limited and will depend on how each of the plurality of electronic devices 202 is implemented. Merely as an example and not as a limitation, in those embodiments of the present technology where each of the plurality of electronic devices 202 is implemented as a wireless communication device (such as a smart-phone), the communication link (not numbered) can be implemented as a wireless communication link (such as but not limited to, a 3G communication network link, a 4G communication network link, a Wireless Fidelity, or WiFi® for short, Bluetooth® and the like). In those examples, where each of the plurality of electronic devices 202 is implemented as a notebook computer, the communication link can be either wireless (such as WiFi®, Bluetooth® or the like) or wired (such as an Ethernet based connection).

The networked computing environment 200 further comprises a GPS satellite 246 transmitting and/or receiving a GPS signal 248 to/from the plurality of electronic devices 202. It will be understood that the present technology is not limited to GPS and may employ a positioning technology other than GPS (such as GLONASS, DORIS, BeiDou, and COMPASS, for example).

Generally speaking, the communication network 240 is configured to transmit inter alia a client data packet 242 (only one depicted) from each of the first electronic device 204, the second electronic device 210, and the third electronic device 216 to each of the search engine server 250, the map server 260, the one or more other servers 270, and the tracking server 280, and is also configured to transmit a server data packet 244 (only one depicted) from each of the search engine server 250, the map server 260, the one or more other servers 270, and the tracking server 280 to the first electronic device 204, the second electronic device 210, and the third electronic device 216.

Search Engine Server

Also coupled to the communication network 240 is the aforementioned search engine server 250. The search engine server 250 can be implemented as a conventional computer server. In an example of an embodiment of the present technology, the search engine server 250 can be implemented as a Dell™ PowerEdge™ Server running the Microsoft™ Windows Server™ operating system. Needless to say, the search engine server 250 can be implemented in any other suitable hardware and/or software and/or firmware or a combination thereof. In the depicted non-limiting embodiment of present technology, search engine server 250 is a single server. In alternative non-limiting embodiments of the present technology, the functionality of the search engine server 250 may be distributed and may be implemented via multiple servers. In some embodiments of the present technology, the search engine server 250 is under control and/or management of a search engine operator. Alternatively, the search engine server 250 can be under control and/or management of a service provider.

The search engine server 250 is configured to host a search engine 252 accessible via the browser application 224 executed by each of the first electronic device 204, the second electronic device 210, and the third electronic device 216. In some embodiments of the present technology, the search engine 252 hosted by the search engine server 250 may be the Yandex™ search engine.

The search engine server 250 maintains a search log database 255, the search log database 255 including an index (not depicted).

Generally speaking, the search engine server 250 is configured to: (i) discover and index documents available on the Web; (ii) execute searches in response to a given search query from a given user of an electronic device transmitted via client data packet 242; (iii) execute analysis of documents and perform ranking of documents in response to the given search query; (iv) group the documents and compile the search engine result page (SERP) to be outputted via server data packet 244 to an electronic device (such as one of the plurality of electronic devices 202), the client device having been used to submit the given search query that resulted in the SERP.

How the search engine server 250 is configured to discover and index documents, execute searches, analysis and ranking of documents is not particularly limited. Those skilled in the art will appreciate several ways and means to implement the search engine server 250 and as such, several structural components of the search engine server 250 will not be described in the context of the present technology.

The search engine server 250 is configured to execute ranking of the identified documents in the index that contain at least some of the plurality of searchable terms of the given query.

Just as an example and not as a limitation, some of the known techniques for ranking search results by relevancy to the user-submitted search query are based on some or all of: (i) how popular a given search query or a response thereto is in searches; (ii) how many results have been returned; (iii) whether the search query contains any determinative terms (such as "images", "movies", "weather" or the like), (iv) how often a particular search query is typically used with determinative terms by other users; and (v) how often other uses performing a similar search have selected a particular resource or a particular vertical search results when results were presented using the SERP. The search engine server 250 can thus calculate and assign a relevance score (based on the different criteria listed above) to each search result obtained in response to a user-submitted search query and generate a SERP, where search results are ranked according to their respective relevance scores. It is contemplated that ranking of documents as search results may be executed in more than one step.

In some embodiments of the present technology, the search engine server 250 can execute ranking for several types of searches, including but not limited to, a general search and a vertical search.

Map Server

Also coupled to the communication network 240 is the map server 260. The map server 260 can be implemented as a conventional computer server. In an example of an embodiment of the present technology, the map server 260 can be implemented as a Dell™ PowerEdge™ Server running the Microsoft™ Windows Server™ operating system. Needless to say, the map server 260 can be implemented in any other suitable hardware and/or software and/or firmware or a combination thereof. In the depicted non-limiting embodiment of present technology, map server 260 is a single server. In alternative non-limiting embodiments of the present technology, the functionality of the map server 260 may be distributed and may be implemented via multiple servers.

Generally speaking, the map server 260 is configured to host one or more map services, which will be referred to the map service 262, for providing map data to the plurality of electronic devices 202. The map server 260 is connected to a map database 265.

The map service 262 hosted by the map server 260 may be accessible via the map application 222, the browser application 224 or any other suitable application on the plurality of electronic devices 202. In some embodiments of the present technology, the map service 262 may be the Yandex.Maps™ map service.

Generally speaking, the map server 260 is configured to: (i) receive, via the communication network 240 from one of the plurality of electronic devices 202 associated with a given user, a request for a map view in the form of client data packet 242; (ii) retrieve map data (such as one or more map tiles, POIs, and interactive elements) required for generating the requested map view from the map database 265; (iii) organize the retrieved map data including the POIs for the given user; and (iv) transmit, via the communication network 240, the organized map data in server data packet 244 for display on the one the plurality of electronic devices 202. How the map service 262 is configured to organize the map data for the given user will be explained in more detail hereinbelow.

As shown in FIG. 2, the map database 265 is communicatively coupled to the map server 260 but, in alternative implementations, the map database 265 may be communicatively coupled to the map server 260 via the communication network 240 without departing from the teachings of the present technology. Although the map database 265 is illustrated schematically herein as a single entity, it is contemplated that the map database 265 may be configured in a distributed manner, for example, the map database 265 could have different components, each component being configured for a particular kind of retrieval therefrom or map storage therein. The map database 265 may be a structured collection of data, irrespective of its particular structure or the computer hardware on which data is stored, implemented or otherwise rendered available for use. The map database 265 may reside on the same hardware as a process that stores or makes use of the information stored in the map database 265 or it may reside on separate hardware, such as on the map server 260. Generally speaking, the map database 265 may receive data from the map server 260 for map storage thereof and may provide stored data to the map server 260 for use thereof.

For example, the YMapsML format can be used as the data storage format in the map database 265. In alternative implementations, the GML format—Geographic Markup Language—can be used as the data storage forma in the map database 265. GML is developed and maintained by the OGC (Open Geospatial Consortium) and is an international ISO standard.

The map database 265 may be configured to store a plurality of map elements associated with the map view to be rendered. In general, the plurality of map elements may comprise all data that is necessary to render the map view in the map application 222 on a given electronic device of the plurality of electronic devices 202. In one embodiment, the plurality of map elements may comprise map tiles, API data and resource data. In some embodiments, the map database 265 may also be configured to store the device data associated with a given electronic device, such as the third electronic device 216 and the user data associated with the given user, such as the third user 218.

Generally speaking, the map tiles may be representative of the whole of the map at each zoom level which may form a map image displayed to the given user via the associated electronic device. Each map tile may include a level of detail (e.g., map tile information) showing various features on that map tile, such as landscape features relevant to its scale, including cities, towns, villages, buildings, roads, railways, walkways, lakes, rivers, woodlands, points of interest, relief or terrain, three-dimensional quality of the surface, specific landforms, etc. Each map tile may also include a level of quality (e.g., map tile resolution) related to graphical resolution of the various features. The map database 265 stores, as part of the map tiles, a plurality of POIs 300, where each respective POI 302 has a set of POI features 304, which will be explained in more detail herein below.

Broadly speaking, the resource data may comprise information about static elements, dynamic elements and interactive elements to be displayed on the map. For example, the resource data may comprise information about labels, toponyms associated with various features and venues on the map, a tool bar, a search bar, a sidebar, various images, geographical coordinates, addresses, etc. Suffice it to state that the resource data may comprise data about any or all data associated with various resources that are necessary for rendering the map view in the map application 222.

Broadly speaking, API data may comprise information for embedding the map into another application, such as the map application 222, and positioning objects thereon. The API data may comprise a set of Java Script components for implementing the interactive elements on the map view in the map application 222. The API data may enable the display of the map with various geo-objects, address searching function, routes plotting, assigning personalised directions, etc. In some embodiments, the API data may enable conversion of geographical coordinates on the map to addresses on the map and vice versa. In other embodiments, the API data may enable identification of coordinates of labels and/or toponyms associated with various features and venues on the map. Needless to say, the API data may comprise information about how the resource data should be implemented and may enable the embedding thereof on the map in order to display interactive elements on the map.

In the context of the present technology, the map server 260 is configured to cause display, for a given map view corresponding to a given zoom level on the map service 262, a respective number of POIs (not depicted in FIG. 2) to the given user of the map service 262 on his or her electronic device, such as the third electronic device 216 of the third user 218. How the map server 260 is configured to cause display the given map view including the POIs will be explained in more detail herein below.

The map server 260 is configured to execute a machine learning algorithm (MLA) 268 for determining similarity between text strings in a continuous multidimensional space. In the context of the present technology, the purpose of the MLA 268 is to project, in a common low-dimensional semantic space, vectors representing preferences of the first user 206, the second user 212, and the third user 218 of the map service 262 (which will be referred to as user vectors), and vectors representing the plurality of POIs 300 in the map service 262 (which will be referred to as POI vectors), such that a distance between a given user vector and a given POI vector may be indicative of a similarity or relevance of the given POI to the given user.

In some embodiments of the present technology, the MLA 268 may be a neural network (NN). In other embodiments of the present technology, the MLA 268 may be a Deep Semantic Similarity Model (DSSM).

How the map server 260 executes the MLA 268 to determine relevance of a POI to a user will be explained in more detail hereinbelow.

Other Servers

In some embodiments of the present technology, one or more other servers 270 (only one depicted) hosting and/or providing a respective service may be coupled to the communication network 240. In an example of an embodiment of the present technology, the one or more other servers 270 may each be implemented as a Dell™ PowerEdge™ Server running the Microsoft™ Windows Server™ operating system. Needless to say, the one or more other servers 270 can be implemented in any other suitable hardware and/or software and/or firmware or a combination thereof. In the depicted non-limiting embodiment of present technology, each of the one or more other servers 270 is a single server. In alternative non-limiting embodiments of the present technology, the functionality of the one or more other servers 270 may be distributed and may be implemented via multiple servers. In other non-limiting embodiments of the present technology, the functionality of the one or more other servers 270 may be implemented as a single server.

As a non-limiting example, as explained herein above, the one or more other servers 270 may host and/or provide, to each of the plurality of electronic devices 202, one or more other services 272 (only one depicted) accessible via the one or more service applications 220 on each of the plurality of electronic devices 202, such as: an email service, a social networking service, a video streaming service, a music streaming service, a taxi service, a ridesharing service, an online marketplace, and the like.

Each of the one or more other server 270 has a respective databases 275 (only one depicted) for storing data required to provide the one or more other services 272.

Tracking Server

Also coupled to the communication network 240 is the above-mentioned tracking server 280. The tracking server 280 can be implemented as a conventional computer server. In an example of an embodiment of the present technology, the tracking server 280 can be implemented as a Dell™ PowerEdge™ Server running the Microsoft™ Windows Server™ operating system. Needless to say, the tracking server 280 can be implemented in any other suitable hardware and/or software and/or firmware or a combination thereof. In the depicted non-limiting embodiment of present technology, the tracking server 280 is a single server. In alternative non-limiting embodiments of the present technology, the functionality of the tracking server 280 may be distributed and may be implemented via multiple servers. In other embodiments of the present technology, the functionality of the tracking server 280 may be implemented completely or in part by each of the search engine server 250, the map server 260, and the one or more other servers 270. In some embodiments of the present technology, the functionality of the tracking server 280 may be performed by the plurality of electronic devices 202. In some embodiments of the present technology, the tracking server 280 is under control and/or management of a search engine operator. Alternatively, the tracking server 280 can be under control and/or management of another service provider.

The tracking server 280 maintains a tracking database 285 for storing user interactions of users. The manner in which the user interactions is stored is not limited, and the user interactions may be stored for individual users, and by applications.

Generally speaking, the tracking server 280 is configured to: (i) track and store user interactions of the first user 206, the second user 212, and the third user 218 with the search engine 252 hosted by the search engine server 250; (ii) track and store user interactions of the first user 206, the second user 212, and the third user 218 with the map service 262 hosted by the map server 260; and (iii) track and store activity the first user 206, the second user 212, and the third user 218 with the one or more other services 272 hosted by the one or more other servers 270. The tracking server 280 is configured to track locations of the first user 206, the second user 212, and the third user 218, which may be performed when there is user interaction with a given one of the one or more service applications 220.

As a non-limiting example, the tracking server 280 may track user interactions of users with search results provided by the search engine 252 of the search engine server 250 in response to user requests (e.g. made by users of one of the plurality of electronic devices 202). The tracking server 280 may track user interactions (such as, for example, click-through data) when users perform general web searches and vertical web searches on the search engine 252, and store the user interactions in the tracking database 285. The tracking server 280 may track, for a given user:
search queries previously submitted on the search engine;
search results previously provided in a SERP by the search engine in response to the search queries;
search results clicked by the given user;
dwell time: time the given user spends on a search result before returning to the SERP.
Long/short click: was the user interaction with the document long or short, compared to the user interaction with other documents on the SERP.

As a non-limiting example, the tracking server 280 may track user interactions of users with map views provided by the map server 260, as an example via the map application 222 or the browser application 224, the user interactions including, for a given user:
requested locations, addresses, and cities;
selected POIs;
visited POIs; and
time spent at the POIs.

As a non-limiting example, the tracking server 280 may track user interactions of users with the one or more other services 272 provided by the one or more other servers 270, as an example via the one or more service applications 220, the user interactions including, for a given user:
bookmarked websites;
restaurants the given user has ordered from;
products the given user has purchased;
videos, music streamed or downloaded by the given user;
It is contemplated that the user interactions may be compiled for a specific period of time, such as: last 365 days, or last 180 days, for example.

In some embodiments of the present technology, the tracking server 280 is configured to perform statistical analysis of user interactions and generate user interaction parameters.

In some embodiments of the present technology, the tracking server 280 may be configured to build a profile of the user, or simply a user profile, associated with the given user and/or the given user's electronic device based on the tracked user interactions with one or more of: the search engine 252, the map service 262, and the one or more other services 272. Additionally or alternatively, the tracking server 280 may be configured to build group profiles, where user profiles having similar user interactions with one or more of the search engine 252, the map service 262, and one or more other services 272 may be part of the same group, which may or may not be maintained in an anonymous manner.

In the context of the present technology, a user profile may be indicative of preferences of the given user with regard to categories related to POIs on the map service 262. The user profile may be generated by a MLA (not depicted) by analyzing user interactions of a given user in the tracking database 285 with the categories.

In some embodiments of the present technology, the one or more service applications 220 operated by the same entity as the map application 222 are configured to report to the tracking server 280 and/or store user activities and/or geo-locations with an accompanying indication of the user device ID or other means for allowing subsequent identification of the user's activity/geo-location history with the user's wireless device(s) via which the user performed the actions constituting the user's activity history.

Figure 3:
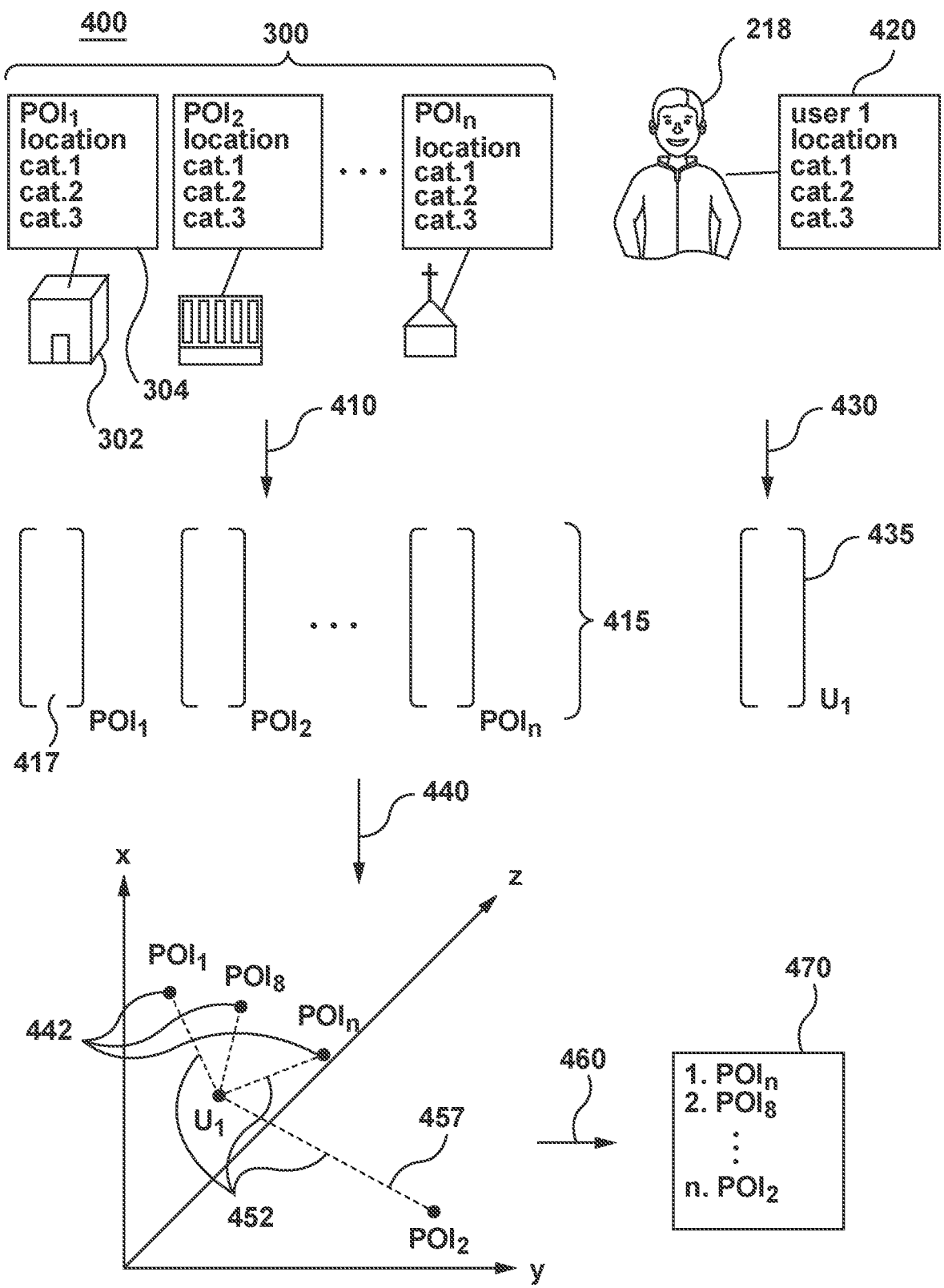
FIG. 3 depicts a schematic diagram of point of interest (POI) suggestion procedure implemented in accordance with non-limiting embodiments of the present technology.

Now turning to FIG. 3, there is depicted a schematic diagram of a POI suggestion procedure 400 for a given user, such as the third user 218 for example, the POI suggestion procedure 400 being depicted in accordance with non-limiting embodiments of the present technology.

POI Suggestion Procedure

The map server 260 is configured to execute the POI suggestion procedure 400 by executing: (i) a POI vector generation procedure 410; (ii) a user vector generation procedure 430; (iii) a distance determination procedure 440; and (iv) a POI ranking procedure 460.

POI Vector Generation Procedure

The map server 260 is configured to execute the POI vector generation procedure 410 to generate a plurality of POI vectors 415, each respective POI vector 417 being a numerical representation of a respective POI 302 of the plurality of POIs 300 based on a set of POI features 304 of the respective POI 302.

The POI vector generation procedure 410 may be executed in an offline mode. The POI vector generation procedure 410 may be executed periodically, such as every week, or upon receiving an indication, for example when new POIs are added to map database 265.

The POI vector generation procedure 410 retrieves, from the map database 265, the plurality of POIs 300. As a non-limiting example, the plurality of POIs 300 may correspond to all POIs for a given country, region, city or area.

Each respective POI 302 of the plurality of POIs 300 has a set of POI features 304.

The set of POI features 304 of the respective POI 302 includes a location of the POI 302, which may be expressed in latitude and longitude coordinates for example. In some embodiments of the present technology, the set of POI features 304 include other features indicative of location of the POI 302 such as: a country in which the POI 302 is located, a region in which the POI 302 is located, a city in which the POI 302 is located, and in which the POI is located.

The set of POI features 304 of the POI 302 includes a group or category of the POI 302, which may be expressed as one-level, two-level or three-lever classifier.

For example, a two-level classifier can include the following headings and subheadings (elements of the classifier that are subheadings are specified in parentheses):

- business and manufacturing (business-centers, companies, manufacturing facilities and other facilities)
- state and society (safety, state agencies, emergency services, social services),
- culture (libraries and archives, exhibition centers, movie theaters, concert halls, culture centers, museums, galleries, mass media, theaters)
- healthcare (pharmacies, hospitals, animal clinics, health centers, women's health clinics, health products, medical centers, medical boards, first-aid posts, optical store, clinics, maternity clinics, health resorts, dental hospitals, injury care centers, other health facilities)
- science and education (scientific institutions, education)
- recreation (cultural sites, natural attractions, entertainment, sport, tourism)
- commercial business (car shops, household goods, clothes and shoes, food, specialized stores, shopping centers, electronics)
- transport (air transport, automobile transport, railway transport, public transport),
- services (road transport services, consumer services, public utilities, accommodation, restaurants, cafeterias, funeral services, other services, communication, beauty services, finance services, legal services, insurance services)
- population centers (cottage communities, area centers, gardeners' partnership)

Three-level and multilevel classifiers have a greater level of detail due to the generation of lower level classifier elements. Thus, for example, in a three-level classifier, all or some of the subheadings can be detailed. For example, the "entertainment" subheading can include lower level classifier elements, such as: waterparks, amusement rides, billiard, bowling alleys, zoos, gambling establishment, movie theaters, night clubs, parks, gardens, recreation parks, paintball, airsoft, beaches, entertainment centers, circuses and other entertainment. As another example, the "car shops" subheading under the "commercial business" heading can include lower level classifier elements, such as: auto parts, automobile dealerships, motor bike dealerships, other car shops.

The set of POI features 304 of the POI 302 may further include information such as: opening hours, popular hours, user rating scores, average price of items, and the like.

The POI vector generation procedure 410 generates, for each POI 302, based on the set of POI features 304, a respective POI vector 417. The manner in which the POI vector 417 is generated is not limited, and generally speaking, a POI vector 417 of a POI 302 is a numerical representation of the set of POI features 304 of the POI 302 in a multi-dimensional space. In some embodiments of the present technology, the MLA 268 may have been trained to generate the POI vector 417 based on the set of POI features 304.

The map server 260 outputs the plurality of POI vectors 415. In some embodiments of the present technology, the map server 260 is configured to store the plurality of POI vector 415 in the map database 265.

User Vector Generation Procedure

The map server 260 is configured to execute the user vector generation procedure 430 to generate a user vector 435 for a given user. In the embodiment illustrated herein, the given user is the third user 218 associated with the third electronic device 216. The user vector 435 is generated based at least in part on past user interactions 310 of the third user 218.

The manner in which the map server 260 executes the user vector generation procedure 430 is not limited. Generally speaking, the user vector generation procedure 430 is executed to generate a user vector 435 based on past user interactions 310 of the third user 218, such that the user vector 435 may be likened with POI vectors in the plurality of POI vectors 415 in a multidimensional space.

In some embodiments of the present technology the map server 260 may execute the user vector generation procedure 430 for a specific group of users, such as frequent users of the map service 262, e.g. users who have recourse to the map service 262 a predetermined number of times a week. In other embodiments of the present technology, the map server 260 may execute the user vector generation procedure 430 for all users of the map service 262, e.g. users having installed the map application 222 on their respective electronic devices, or users being registered with the map service 262.

In some embodiments of the present technology, the user vector generation procedure 430 may be executed in an offline mode. The user vector generation procedure 430 may be executed periodically, such as every week for example.

In other embodiments of the present technology, the map server 260 receives an indication (via client data packet 242 for example), which may include a user ID, which may cause the map server 260 to execute the user vector generation procedure 430. In such embodiments, user vector generation procedure 430 is configured to determine, based on the indication of the user ID, a set of services (not depicted) associated with the third user 218. The set of services associated with the third user 218 includes at least the map service 262 and additionally at least one of: the search engine 252, the map service 262, and the one or more other services 272.

The user vector generation procedure 430 retrieves, from the tracking database 285, past user interactions 310 of the third user 218 with at least one of: the search engine 252, the map service 262, the one or more other services 272, which may have been performed on the third electronic device 216 via the one or more service applications 220.

The user vector generation procedure 430 analyzes the past user interactions 310 to extract a set of user features 420, where the set of user features 420 are indicative of preferences of the given user with respect to POIs. The manner in which the map server 260 extract features from the past user interactions 310 is not limited.

In alternative embodiments of the present technology, the set of user features 420 may have been previously extracted by the tracking server 280, and be part of the user profile (not depicted) of the third user 218, which may be stored in the tracking database 285 for example.

In the simplest instance, the user vector generation procedure 430 may extract the set of user features 420 based on past user interactions 310 of the third user 218 with at least a portion of the plurality of POIs 300 in the map service 262 during a predetermined period of time. As a non-limiting example, the set of user features 420 may indicate if the third user 318: has visited a given POI, a number of times he has visited the given POI, time spent at the given POI, and the like. In some embodiments of the present technology, where the given POI is part of a retail chain for example, the set of user features 420 may indicate if the given user has visited POIs of the retail chain in other locations.

The past user interactions 310 of the given user with the POIs may include clicks on the POIs in the map service 262, physical site visit to the POI, a visits to websites related to the POIS (e.g. official website), and the like.

It is contemplated that the user vector generation procedure 430 may retrieve one or more of: a current location of the third user 218, a home location of the third user 218 (which may have been previously input by the third user 218 or may have been determined based on past locations of the third user 218), and a work location of the third user 218, and include the location information in the set of user features 420.

In some embodiments of the present technology, the set of user features 420 may indicate past user interactions of the third user 218, with group or categories of POIs, which may be a one-level, two-level or three-lever classifier, similarly to how the POIs are classified in the set of POI features 304. As a non-limiting example, for two-level classifiers, the set of user features 420 may indicate past user interactions with the following categories (which may be determined based on past locations of the user for example):

business and manufacturing (business-centers, companies, manufacturing facilities and other facilities)
state and society (safety, state agencies, emergency services, social services),
culture (libraries and archives, exhibition centers, movie theaters, concert halls, culture centers, museums, galleries, mass media, theaters)
healthcare (pharmacies, hospitals, animal clinics, health centers, women's health clinics, health products, medical centers, medical boards, first-aid posts, optical store, clinics, maternity clinics, health resorts, dental hospitals, injury care centers, other health facilities)
science and education (scientific institutions, education)
recreation (cultural sites, natural attractions, entertainment, sport, tourism)
commercial business (car shops, household goods, clothes and shoes, food, specialized stores, shopping centers, electronics)
transport (air transport, automobile transport, railway transport, public transport),
services (road transport services, consumer services, public utilities, accommodation, restaurants, cafeterias, funeral services, other services, communication, beauty services, finance services, legal services, insurance services)
population centers (cottage communities, area centers, gardeners' partnership)

In some embodiments of the present technology, where past user interactions 310 of the user with the one or more other services 272 is available in the tracking database 285, the set of POI features 304 may be enriched with information available from the past user interactions 310 with the one or more other services 272.

Additionally, past search history on the search engine 252 of the third user 218 relating to the POIs or categories associated with the POIs may be used, e.g. how many times has the third user 218 searched for scientific information on the search engine 252, how many times has the third user 218 searched for health related information on the search engine 252, how many times has the third user searched for information about a product or company, and the like.

Additionally, past purchases in a market application or a food delivery application may indicate preferences of the given user with a given product company, or restaurant for example.

In some embodiments of the present technology, information from past user interactions 310 with services may be correlated with POI categories and included, e.g., the third user 218 may generally listen to classical music on a music streaming service and watch documentaries on a video streaming service, which may indicate that he would be interested in culture centers.

The map server 260 is configured to generate user vector 435 for the third user 218 based on the set of user features 420.

The map server 260 outputs the user vector 435 for the third user 218. In some embodiments of the present technology, the map server 260 stores, in the map database 265, the user vector 435 associated with the given user.

Distance Determination Procedure

The map server 260 is configured to execute the distance determination procedure 440. In some embodiments of the present technology, the map server 260 accesses the MLA 268 to execute the distance determination procedure 440.

In other embodiments of the present technology, the map server 260 may execute the distance determination procedure 440 in an offline mode, and store results in the map database 265 for example.

The map server 260 is configured to retrieve the user vector 435 of the given user associated with the request received via client data packet 242 for example.

The map server 260 is configured to retrieve a set of POI vectors 442 from the plurality of POI vectors 415 stored in the map database 265. The set of POI vectors 442 may be retrieved based on a current location of the third user 218, which may have been received via client data packet 242.

The purpose of the distance determination procedure 440 is to determine respective distances 452 between the user vector 435 of the third user 218 and each respective POI vector 417 of the set of POI vectors 442. The respective distance 457 between the user vector 435 and a respective POI vector 417 may be indicative of a degree of similarity between the set of user features 420 associated with the third user 218 and the set of POI features 304 associated with the respective POI 302, which may in turn indicate that the third user 218 would be interested in the POI 302.

The map server 260 may execute the distance determination procedure 440 upon receiving an indication, as an example in the form of a request for a map view via client data packet 242.

The manner in which the MLA 268 determines the respective distance 457 between the user vector 435 and each POI vector 417 of the set of POI vectors 415 is not limited. Generally speaking, the MLA 268 may have been trained to generate POI vectors and a user vector such that a POI vector of a given POI aligned with the user interests of a given user may be projected close in the multi-dimensional space.

As a non-limiting example, the respective distance 457 between the user vector 435 and the POI vector 417 may be determined by computing a cosine similarity, an inner product, or any other method allowing to measure similarity between vectors.

It is contemplated that in some embodiments of the present technology, the map server 260 may be configured to weight differently some features in the POI vector 417 to give more importance to those features when computing the respective distance 457 between the user vector 435 and the POI vector 417. As a non-limiting example, a higher weight (as compared to other features) may be given to the distance of the respective POI 302 (present in the POI vector 417) from the current location of the third user 218 from the work location of the third user 218, or from the home location of the third user 218 (present in the user vector 425). It should be noted that in some instances, the third user 218 may be interested in a map view of a remote location (e.g. not within a predetermined distance of the third user 218 current location), and in such cases, a lower weight (or no weight at all) may be given to the distance between the current location of the third user 218 and the location of the respective POI 302

Generally speaking, the shorter the respective distance 457 between the user vector 435 and the POI vector 417 is, the more similar the set of user features 420 of the third user 218 and the set of POI features 304 of the respective POI 302 are, which may in turn indicate that the third user 218 is more likely to be looking for and/or be interested in the POI 302 associated with the POI vector 417.

As a non-limiting example, continuing with the example of the third user 218 who has previously visited museums, has read articles about classical music, and has watched various documentaries, the user vector 435 may have high values for features related to culture centers, music theaters, and film theaters. Thus, a distance between a POI vector of a classical music museum (not depicted) and the third user 218 may be short.

The map server 260 may compute the respective distances 452 between the user vector 435 and each respective POI vector 417 of the set of POI vectors 442.

POI Ranking Procedure

The map server 260 is then configured to execute the POI ranking procedure 460 to rank the set of POIs (not depicted) based on the respective distances 452 between each POI vector of the set of POI vectors 442 and the user vector 435, to obtain a ranked set of POIs 470.

The map server 260 may as an example rank the set of POIs (not depicted) in an ascending order based on the respective distances 452 between the user vector 435 and the set of POI vectors 442 i.e. from shortest distance to the longest distance to obtain the ranked set of POIs 470. In some embodiments of the present technology, the map server 260 may rank the POIs (not depicted) by categories, or based on options selected by the given user on the map application 222 for example.

Generally speaking, the POI ranking procedure 460 may be executed for all POIs within a predetermined distance of a given location (which may be a current location of the third user 218, or a central location of a map view requested by the third user 218 for example) to obtain the ranked set of POIs 470. Thus, if the third user 218 zooms to a given zoom level, only a subset of the ranked set of POIs 470 may be displayed, where the subset of the ranked set of POIs 470 includes a predetermined number of POIs for the given zoom level. In other embodiments of the present technology, the POI ranking procedure 460 may be executed for each given zoom level (which may be included in client data packet 242 for example)

Figure 4:
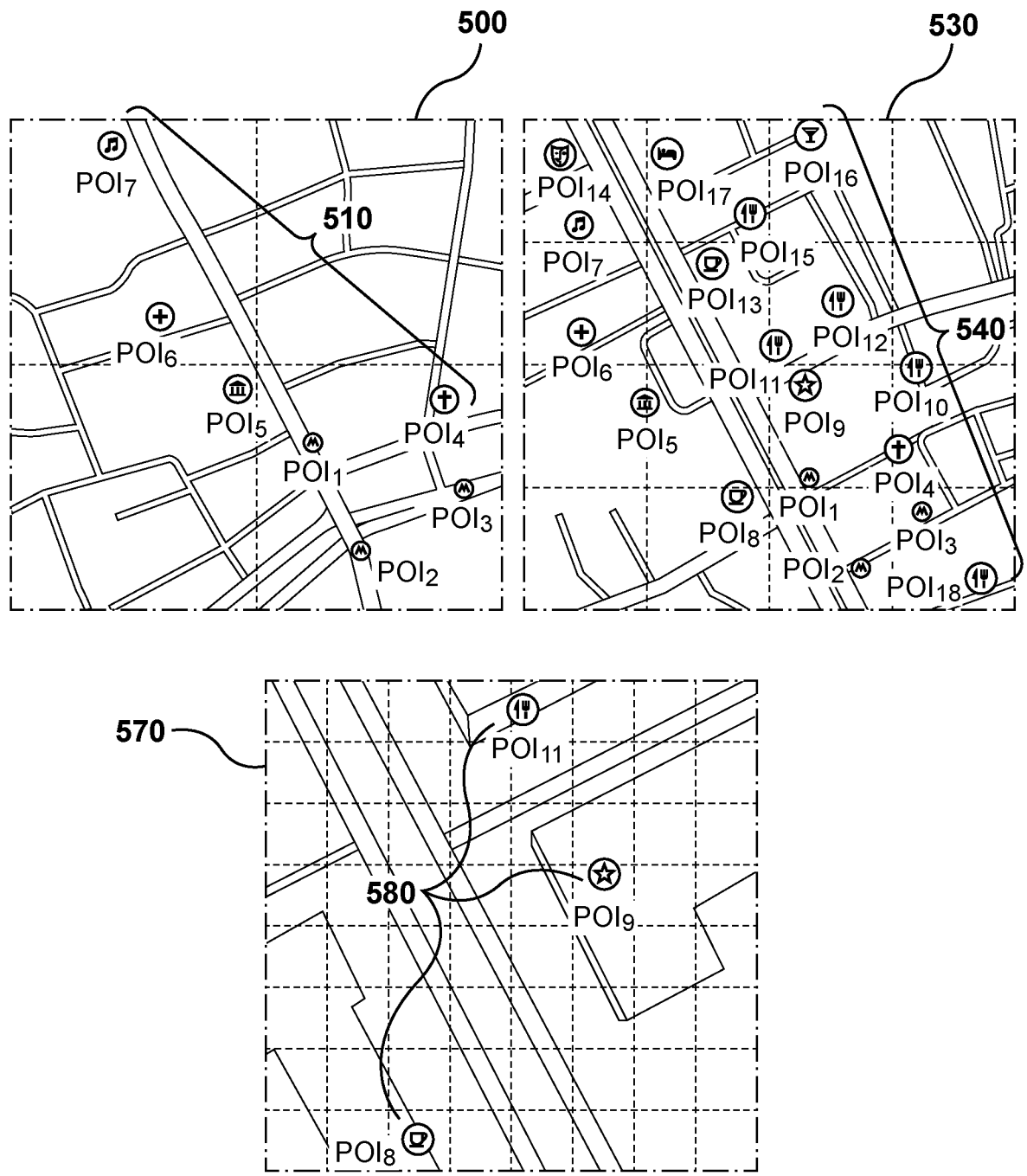
FIG. 4 depicts a schematic diagram of map views presented at different zoom levels with respective subset of POIs presented in accordance with non-limiting embodiments of the present technology.

With reference to FIG. 4, there is depicted, in accordance with non-limiting embodiments of the present technology, a schematic diagram of map views presented at different zoom levels with a respective subset of POIs from the set of ranked POIs 470 for the third user 218.

Map Views

The map server 260 is configured to cause display a specific number of POIs for a given zoom level on the map application 222, i.e. the map server 260 can cause display a respective subset of the set of ranked POIs 470 for a given zoom level. Generally speaking, each respective subset of ranked POIs of the set of ranked POIs 470 may be presented such that POIs in the respective subset of ranked POIs do not overlap for the given level. In some embodiments of the present technology, other information associated with a respective POI 302 (such as labels, description tabs, or other information) may be omitted for a given zoom level, or presented differently. Additionally or alternatively, sizes of POIs in the respective subset of ranked POIs in the map view may be indicative of their respective ranking (a higher ranked POI may have a bigger size graphical representation than a lower ranked POI for example).

In some embodiments of the present technology, the map server 260 determines a respective number of POIs to present for each zoom level, based on device data of the electronic device of the given user, such as the third electronic device 216 of the third user 218, where user data be transmitted via client data packet 242. The device data may include information such as: screen size, screen resolution, processor model, graphical unit model, and the like.

In some embodiments of the present technology, a given map view may have thirteen different zoom levels, where each zoom level is associated with a respective number of tiles, and a respective number of POIs in a subset of POIs. In some embodiments of the present technology, POIs having been ranked higher in the set of ranked POIs 470 may be represented differently, such as with more details or information than POIs having been ranked lower.

As a first non-limiting example, a first map view 500 of Tverskaya Street (Тверская улица) in Moscow, Russia consists of four map tiles, and corresponds to a second zoom level on the map application 222 of the third electronic device 216. The first map view 500 may have a first subset of ranked POIs 510, the first subset of ranked POIs 510 having the eighteen top- ranked POIs of the set of ranked POIs 470 corresponding to the second zoom level.

As a second non-limiting example, a second map view 530 of Tverskaya Street (Тверская улица) in Moscow, Russia consists of sixteen map tiles, and corresponds to a third zoom level on the map application 222 of the third electronic device 216. The second map view 530 may have a second subset of ranked POIs 540, the second subset of ranked POIs 540 having the six top-ranked POIs of the set of ranked POIs 470 corresponding to the third zoom level.

As a third non-limiting example, a third map view 570 of Tverskaya Street (Тверская улица) in Moscow, Russia consists of sixty-four map tiles and corresponds to a fourth zoom level on the map application 222 of the third electronic device 216. The third map view 570 may have a third subset of ranked POIs 580, the third subset of ranked POIs 580 having the three top-ranked POIs of the set of ranked POIs 470 corresponding to the fourth zoom level.

Method Description

Figure 5:
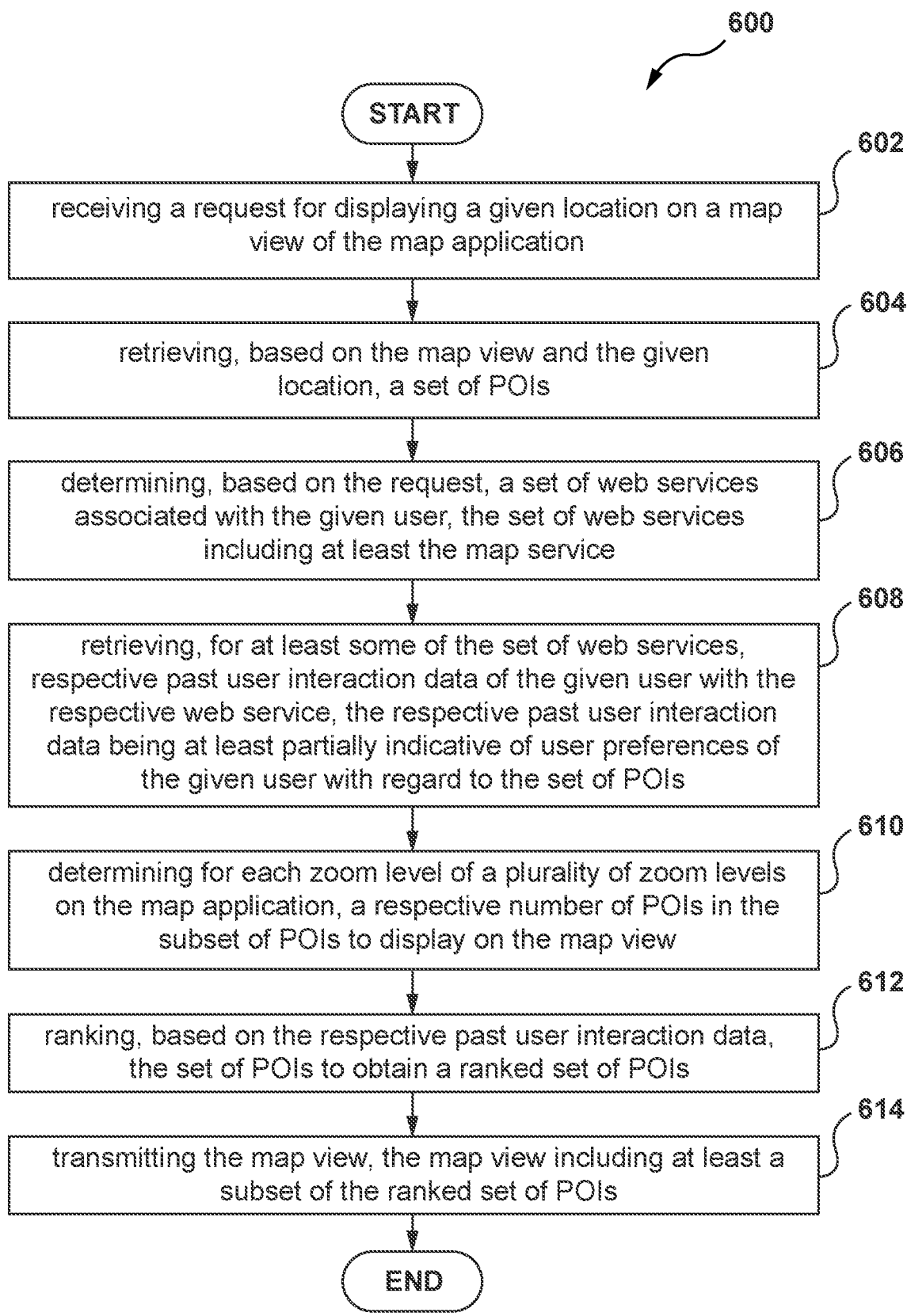
FIG. 5 depicts a block diagram of a method of presenting POIs in a map view on an electronic device, the method being implemented in accordance with non-limiting embodiments of the present technology.

Reference is now being made to FIG. 5, which depicts a flowchart of a method 600 of presenting POIs in a map view on an electronic device, the method 600 being executed in accordance with non-limiting embodiments of the present The method 600 is executed by the map server 260. The map server 260 may store computer-readable instructions (not depicted) for example in the solid-state drive 120 or the memory 130, where the processor 110, upon executing the computer-readable instructions may be configured to execute the method 600.

The method 600 begins at step 602.

Step 602: Receiving a Request for Displaying a Given Location on a Map View of the Map Application At step 602, the processor 110 of the map server 260 is configured to receive a request, via client data packet 242, for displaying a given location on a map view of the map application 222 on the third electronic device 216. In some embodiments of the present technology, the request may include a current location and/or a user identifier of the third user 218 associated with the third electronic device 216.

The method 600 advances to step 604.

Step 604: Retrieving, Based on the Map View and the Given Location, a Set of POIs At step 604, the processor 110 of the map server 260 is configured to retrieve, based on the map view and the given location, a set of POIs (not depicted) from the map database 265.

In some embodiments of the present technology, to retrieve the set of POIs (not depicted) the processor 110 of the map server 260 is configured to retrieve the set of POI vectors 442 associated with the set of POIs. The set of POI vectors 442 may have been generated by executing method 700.

The method 600 advances to step 606.

Step 606: Determining, Based on the Request, a Set of Web Services Associated with the Given User, the Set of Web Services Including at Least the Map Service At step 606, the processor 110 of the map server 260 is configured to determine, based on the request in the client data packet 242, a set of web services associated with the third user 218, the set of web services including at least the map service 262. The map service 262 is hosted on the map server 260.

In some embodiments of the present technology, determining the set of web services associated with the given user includes determining a user profile associated with the third user 218 based on the request. The user profile may be stored in the tracking database 285.

In some embodiments of the present technology the set of web services includes at least one of: a search engine 252, an email service, a taxi service, a ride sharing service, a navigation service, and a browser service.

The method 600 advances to step 608.

Step 608: Retrieving, for at Least Some of the Set of Web Services, Respective Past User Interaction Data of the Given User With the Respective Web Service, the Respective Past User Interaction Data Being at Least Partially Indicative of User Preferences of the Given User With Regard to the Set of POIs At step 608, the processor 110 of the map server 260 is configured to retrieve, from the tracking database 285, past user interactions 310 of the third user 218 with at least one of: the search engine 252, the map service 262, the one or more other services 272, which may have been performed by the third user 218 on the third electronic device 216 via the one or more service applications 220. The past user interactions 310 are at least partially indicative of user preferences of the third user 218 with regard to the set of POIs.

In some embodiments of the present technology, the processor 110 of the map server 260 is configured to execute method 800 before advancing to step 610.

The method 600 advances to step 610.

Step 610: Determining for Each Zoom Level of a Plurality of Zoom Levels on the Map Application, a Respective Number of POIs in the Subset of POIs to Display on the Map View At step 610, the processor 110 of the map server 260 is configured to determine, for each zoom level of a plurality of zoom levels on the map application, a respective number of POIs to display on the map view.

In some embodiments of the present technology, the subset of the ranked set of POIs corresponds to the respective number for a current zoom level, the current zoom level being included in the client data packet 242.

In some embodiments of the present technology, the subset of the ranked set of POIs corresponds to the respective number for a requested zoom level, the request zoom level being included in the client data packet 242.

The method 600 advances to step 612.

Step 612: Ranking, Based on the Respective Past User Interaction Data, the Set of POIs to Obtain a Ranked Set of POIs At step 612 the processor 110 of the map server 260 accesses the MLA 268 to execute the distance determination procedure 440 to determine respective distances 452 between the user vector 435 of the third user 218 and each respective POI vector 417 of the set of POI vectors 442. The respective distance 457 between the user vector 435 and a respective POI vector 417 may be indicative of a degree of similarity between the set of user features 420 associated with the third user 218 and the set of POI features 304 associated with the respective POI 302, which may in turn indicate that the third user 218 would be interested in the POI 302.

The map server 260 is then configured to execute the POI ranking procedure 460 to rank the set of POIs (not depicted) based on the respective distances 452 between each POI vector of the set of POI vectors 442 and the user vector 435, to obtain a ranked set of POIs 470.

The method 600 advances to step 614.

Step 614: Transmitting the Map View, the Map View Including at Least a Subset of the Ranked set of POIs At step 614, the processor 110 of the map server 260 is configured to transmit, via server data packet, map tiles, API data and resource data for presenting, on a display interface of the third electronic device 216 the map view to the third user 218, where the map tiles include at least a subset of the ranked set of POIs 470.

The method 600 may then end.

Figure 6:
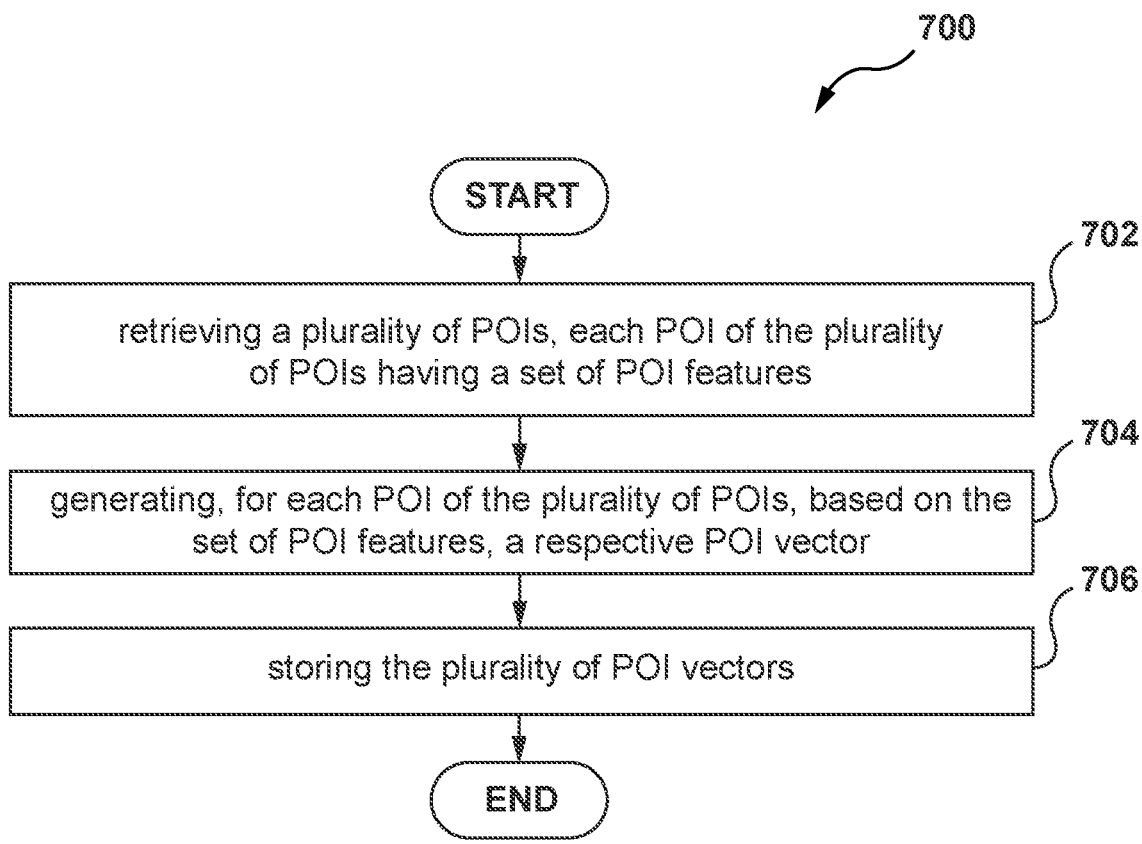
FIG. 6 depicts a block diagram of a method of generating a set of POI vectors, the method being implemented in accordance with non-limiting embodiments of the present technology.

FIG. 6 depicts a flowchart of a method 700 of generating a plurality of POI vectors 415 for a plurality of POIs 300, the method 700 being executed in accordance with non-limiting embodiments of the present technology.

The method 700 is executed by the map server 260. The map server 260 may store computer-readable instructions (not depicted) for example in the solid-state drive 120 or the memory 130, where the processor 110, upon executing the computer-readable instructions may be configured to execute the method 700.

The method 700 may begin at step 702.

Step 702: Retrieving a Plurality of POIs, each POI of the Plurality of POIs Having a Set of POI Features At step 702, the processor 110 of the map server 260 is configured to retrieve, from the map database 265, a plurality of POIs 300, each respective POI 302 of the plurality of POIs 300 having a set of POI features 304

The method 700 advances to step 704.

Step 704: Generating, for Each POI of the Plurality of POIs, Based on the Set of POI Features, a Respective POI Vector At step 704, the processor 110 of the map server 260 is configured to access the MLA 268 and generate, for each respective POI 302 of the plurality of POIs 300, based on the set of POI features 304, a respective POI vector 417.

The set of POI features 304 of the respective POI 302 includes a location of the POI 302, which may be expressed in latitude and longitude coordinates for example. In some embodiments of the present technology, the set of POI features 304 include other features indicative of location of the POI 302 such as: a country in which the POI 302 is located, a region in which the POI 302 is located, a city in which the POI 302 is located, and in which the POI is located.

The set of POI features 304 of the POI 302 includes a group or category of the POI 302, which may be expressed as one-level, two-level or three-lever classifier.

The processor 110 of the map server 260 outputs the plurality of POI vectors 415.

The method 700 advances to step 706.

Step 706: Storing the Plurality of POI Vectors

At step 706, the processor 110 of the map server 260 is configured to store the plurality of POIs vector 415 in the map database 265.

Figure 7:
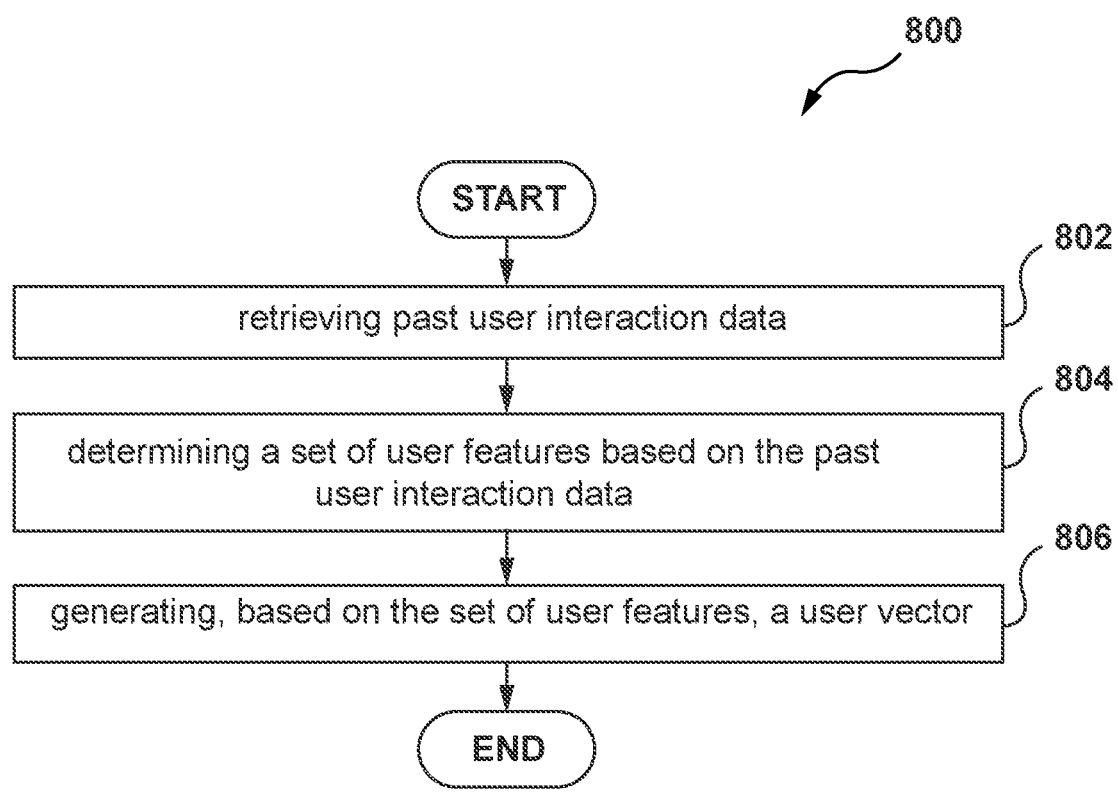
FIG. 7 depicts a block diagram of a method of generating a user vector, the method being implemented in accordance with non-limiting embodiments of the present technology.

FIG. 7 depicts a flowchart of a method 800 of generating a user vector for a given user in accordance with non-limiting embodiments of the present technology.

The method 8 is executed by the map server 260. The map server 260 may store computer-readable instructions (not depicted) for example in the solid-state drive 120 or the memory 130, where the processor 110, upon executing the computer-readable instructions may be configured to execute the method 800.

The method 800 may begin at step 802.

Step 802: Retrieving Past User Interaction Data

At step 802, the processor 110 of the map server 260 is configured to retrieve from the tracking database 285, past user interactions 310 of the third user 218 with at least one of: the search engine 252, the map service 262, the one or more other services 272, which may have been performed on the third electronic device 216 via the one or more service applications 220. The processor 110 of the map server 260 is configured to analyze the past user interactions 310 to extract a set of user features 420, where the set of user features 420 are indicative of preferences of the given user with respect to POIs.

The method 800 advances to step 804.

Step 804: Determining a Set of User Features Based on the Past User Interaction Data At step 804, the processor 110 of the map server 260 is configured to 310 to determine a set of user features 420, where the set of user features 420 are indicative of preferences of the given user with respect to POIs.

In some embodiments of the present technology, the set of user features 420 may be generated based past user interactions 310 of the third user 218 with at least a portion of the plurality of POIs 300 in the map service 262 during a predetermined period of time. As a non-limiting example, the set of user features 420 may indicative if the third user 318: has visited a given POI, a number of times he has visited the given POI, time spent at the given POI, and the like. In some embodiments of the present technology, where the given POI is part of a retail chain for example, the set of user features 420 may indicate if the given user has visited POIs of the retail chain in other locations.

In some embodiments of the present technology, the set of user features 420 may indicate past user interactions with group or categories of POIs, which may be a one-level, two-level or three-lever classifier, similarly to how the POIs are classified.

The method 800 advances to step 806.

Step 806: Generating, Based on the Set of User Features, a User Vector

At step 806, the processor 110 of the map server 260 is configured to generate user vector 435 for the third user 218 based on the set of user features 420.

The method 800 ends

It should be apparent to those skilled in the art that at least some embodiments of the present technology aim to expand a range of technical solutions for addressing a particular technical problem, namely by improving presentation of points of interests for a specific user on of a map service, which may save bandwidth as well as computational resources on the client device.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

One skilled in the art will appreciate when the instant description refers to "receiving data" from a user that the electronic device executing receiving of the data from the user may receive an electronic (or other) signal from the user. One skilled in the art will further appreciate that displaying data to the user via a user-graphical interface (such as the screen of the electronic device and the like) may involve transmitting a signal to the user-graphical interface, the signal containing data, which data can be manipulated and at least a portion of the data can be displayed to the user using the user-graphical interface.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method for presenting points of interest (POIs) to a given user in a map application executed by a client device associated with the given user, the client device being connected to the server, the server executing a map service, the method being executable by the server, the method comprising:
receiving, by the server from the client device, a request for displaying a given location on a map view of the map application;
retrieving, by the server, based on the map view and the given location, a set of POIs;
determining, by the server, based on the request, a set of web services associated with the given user, the set of web services including at least the map service;
retrieving, by the server, for at least some of the set of web services, respective past user interaction data of the given user with the respective web service, the respective past user interaction data being at least partially indicative of user preferences of the given user with regard to the set of POIs;
ranking, by the server, based on the respective past user interaction data, the set of POIs to obtain a ranked set of POIs;
determining, by the server, for a given zoom level of a plurality of zoom levels on the map application, a respective number of POIs of the ranked set of POI's to be included in a subset of POIs to be displayed on the map view;
transmitting, by the server to the client device, the map view, the map view including at least the subset of POIs for presentation to the given user on a display interface of the client device for the given zoom level, the subset of POIs including at least one POI having no past user interaction data from the given user.

2. The method of claim 1, wherein the subset of the ranked set of POIs corresponds to the respective number for a current zoom level.

3. The method of claim 1, wherein the subset of the ranked set of POIs corresponds to the respective number for a requested zoom level.

4. The method of claim 1, wherein the determining the set of web services associated with the given user includes determining a user profile associated with the given user based on the request.

5. The method of claim 1, wherein the method further comprises analyzing the user profile to determine at least one parameter used ranking POIs.

6. The method of claim 1, wherein the set of web services includes at least one of: an email service, a taxi service, a ride sharing service, a navigation service, and a browser service.

7. The method of claim 1, wherein
each POI of the set of POIs has at least one feature, the at least one feature being at least one of: a name, a description, a category, and a location; and wherein the retrieving the respective past user interaction data is based at least in part on respective past user interactions of the given user with the at least one feature in the respective web service.

8. The method of claim 7, wherein
the method further comprises, prior to the retrieving the set of POIs:
generating, by a machine learning algorithm (MLA) executed by the server, for each POI of the set of POIs, a respective vector representation of the POI in a multidimensional space, the respective vector representation being based on the at least one feature; wherein
the method further comprises, prior to the ranking the set of POIs:
generating, by the MLA, based on the respective past user interaction data of the given user with the at least one feature in the set of web services, a given user vector in the multidimensional space; and wherein
the ranking is based at least in part on respective distances between the given user vector and each respective vector representation of the POI in the set of POIs.

9. The method of claim 8, wherein
the method further comprises, prior to the ranking the set of POIs:
retrieving, by the server, a set of user vectors having been previously generated by the MLA, each respective user vector being associated with a respective user of the set of web services, each respective user vector having been generated based on respective past user interactions of the respective user with the at least one feature;
determining, by the MLA, a respective distance between the given user vector and each respective user vector of the set of user vectors; and
selecting, by the MLA, at least one user vector having a minimal distance with the given user vector; and wherein
the ranking is further based at least in part on respective distances between the at least one user vector and each respective vector representation of the POI in the set of POIs.

10. The method of claim 8, wherein the MLA is a neural network (NN).

11. The method of claim 8, wherein the MLA is a Deep Structured Semantic Model (DSSM).

12. The method of claim 8, wherein the past user interaction data includes at least one of:
past number of clicks on the POI of the set of POIs;
past number of visits at the POI of the set of POIs.

13. The method of claim 1, wherein the retrieving, by the server, for at least some of the set of web services comprises retrieving for each web service of the set of web services.

14. A server for presenting points of interest (POIs) to a given user in a map application executed by a client device associated with the given user, the client device being connected to the server, the server executing a map service, the server comprising:
a processor;
a non-transitory computer-readable medium comprising instructions;
the processor, upon executing the instructions, being configured to:
receive from the client device, a request for displaying a given location on a map view of the map application;
retrieve based on the map view and the given location, a set of POIs;
determine based on the request, a set of web services associated with the given user, the set of web services including at least the map service;

retrieve for at least some of the set of web services, respective past user interaction data of the given user with the respective web service, the respective past user interaction data being at least partially indicative of user preferences of the given user with regard to the set of POIs;

rank based on the respective past user interaction data, the set of POIs to obtain a ranked set of POIs;

determine, by the server, for a given zoom level of a plurality of zoom levels on the map application, a respective number of POIs to be included in a subset of POIs to be displayed on the map view;

transmit to the client device, the map view, the map view including at least the subset of POIs for presentation to the given user on a display interface of the client device for the given zoom level, the subset of POIs including at least one POI having no past user interaction data from the given user.

15. The server of claim 14, wherein the subset of the ranked set of POIs corresponds to the respective number for a current zoom level.

16. The server of claim 14, wherein the subset of the ranked set of POIs corresponds to the respective number for a requested zoom level.

17. The server of claim 14, wherein the determining the set of web services associated with the given user includes determining a user profile associated with the given user based on the request.

\* \* \* \* \*